(12) United States Patent
Naglost et al.

(10) Patent No.: US 9,805,209 B2
(45) Date of Patent: Oct. 31, 2017

(54) SYSTEMS AND METHODOLOGIES FOR MANAGING DOCUMENT ACCESS PERMISSIONS

(71) Applicant: Berkeley Information Technology Pty Ltd, Sydney (AU)

(72) Inventors: Mark Peter Naglost, Pyrmont (AU); Scott David Coles, Waverton (AU); David Klein, Sydney (AU); Justin Dahl, Sydney (AU)

(73) Assignee: Berkeley Information Technology Pty Ltd, Sydney (AU)

(*) Notice: Subject to any disclaimer, the term of this patent is extended or adjusted under 35 U.S.C. 154(b) by 0 days.

(21) Appl. No.: 14/446,061

(22) Filed: Jul. 29, 2014

(65) Prior Publication Data

US 2015/0033327 A1 Jan. 29, 2015

(30) Foreign Application Priority Data

Jul. 29, 2013 (AU) ................................ 2013902796

(51) Int. Cl.
| | | |
|---|---|---|
| *G06F 21/00* | (2013.01) | |
| *G06F 21/62* | (2013.01) | |
| *H04L 29/06* | (2006.01) | |
| *G06F 21/31* | (2013.01) | |

(52) U.S. Cl.
CPC ...... *G06F 21/6218* (2013.01); *H04L 63/0807* (2013.01); *H04L 63/0884* (2013.01); *H04L 63/101* (2013.01); *G06F 21/31* (2013.01)

(58) Field of Classification Search
CPC ................ G06F 21/31; G06F 21/6218; H04L 63/0807; H04L 63/0884; H04L 63/101
See application file for complete search history.

(56) References Cited

U.S. PATENT DOCUMENTS

| | | | | |
|---|---|---|---|---|
| 7,035,854 B2* | 4/2006 | Hsiao | ................... | G06F 21/6218 |
| 7,200,869 B1* | 4/2007 | Hacherl | .............. | G06F 12/1433 |
| | | | | 707/999.201 |
| 7,219,234 B1 | 5/2007 | Ashland et al. | | |
| 7,249,328 B1* | 7/2007 | Davis | ..................... | G06F 17/212 |
| | | | | 707/999.202 |
| 7,389,430 B2* | 6/2008 | Baffes | ................. | H04L 63/0815 |
| | | | | 709/229 |
| 7,555,771 B2* | 6/2009 | Bransom | ............. | G06F 21/6218 |
| | | | | 726/27 |
| 8,219,919 B2* | 7/2012 | Norring | .............. | G06F 21/6218 |
| | | | | 707/792 |

(Continued)

OTHER PUBLICATIONS

International Search Report, dated Sep. 2, 2014, for International Application No. PCT/AU2014/000759, 5 pages.

(Continued)

*Primary Examiner* — Mohammad A Siddiqi
(74) *Attorney, Agent, or Firm* — Seed IP Law Group LLP

(57) ABSTRACT

Described herein are systems and methodologies for managing document access permissions. Embodiments of the invention have been particularly developed for allowing group-based permission management in a file system. While some embodiments will be described herein with particular reference to that application, it will be appreciated that the invention is not limited to such a field of use, and is applicable in broader contexts.

14 Claims, 8 Drawing Sheets

(56) References Cited

U.S. PATENT DOCUMENTS

| | | | |
|---|---|---|---|
| 8,869,288 B2* | 10/2014 | Conley | G06F 21/10 |
| | | | 705/51 |
| 2004/0123131 A1* | 6/2004 | Zacks | H04N 1/32128 |
| | | | 726/27 |
| 2005/0278390 A1* | 12/2005 | Kaler | G06F 21/6218 |
| 2006/0048234 A1 | 3/2006 | Imaizumi et al. | |
| 2007/0162320 A1 | 7/2007 | Joshi et al. | |
| 2007/0199057 A1* | 8/2007 | Plummer | G06F 21/52 |
| | | | 726/9 |
| 2009/0228311 A1 | 9/2009 | Chieu et al. | |
| 2011/0178619 A1* | 7/2011 | Jung | G05B 19/0426 |
| | | | 700/95 |
| 2012/0185435 A1* | 7/2012 | Misra | G06F 17/3023 |
| | | | 707/638 |
| 2012/0204220 A1* | 8/2012 | Lavi | H04L 63/0263 |
| | | | 726/1 |
| 2015/0261728 A1* | 9/2015 | Davis | G06F 17/218 |
| | | | 715/234 |

OTHER PUBLICATIONS

Written Opinion, dated Sep. 2, 2014, for International Application No. PCT/AU2014/000759, 5 pages.

* cited by examiner

SYSTEMS AND METHODOLOGIES FOR MANAGING DOCUMENT ACCESS PERMISSIONS

FIELD OF THE INVENTION

The present invention relates to systems and methodologies for managing document access permissions. Embodiments of the invention have been particularly developed for allowing group-based permission management in a file system. While some embodiments will be described herein with particular reference to that application, it will be appreciated that the invention is not limited to such a field of use, and is applicable in broader contexts.

BACKGROUND

Any discussion of the background art throughout the specification should in no way be considered as an admission that such art is widely known or forms part of common general knowledge in the field.

There are various situations where a desire exists to restrict access to certain documents. This is achieved by setting permissions for a document. In general terms, a common approach for managing document permissions is to associate a given document with one or more permissions, and compare those with permissions granted to a user.

Maintenance of security of electronic documents (such as files) is an important aspect of any multiuser system. Various users (based on their position in a formal hierarchy) may have various access rights for a given document. For example, some users may be denied access to it, some may be allowed to only read it, some may be allowed to read as well as modify it whereas some others may be able to only execute it. Both the maintenance of the access rights of the various uses for the different documents stored on the system as well as controlling document access in accordance with these stored access rights are crucial for a successful system operation.

Therefore there is a need in the industry for developing an improved process for providing security access policy in a document management system. This should be based on a combination of the formal organisational hierarchy and a permission hierarchy to simplify administration and to establish clear ownership of objects within the system. This would be simplified and natural group-based administration rather than basing it on more artificial technology-based aggregations such as "sites" or "subsites" or "lists". It should also allow for both inheritance of permissions throughout the hierarchy and enforcement of combined exclusive permissions ("subtractive" permissions) based on membership in multiple groups.

SUMMARY OF THE INVENTION

It is an object of the present invention to overcome or ameliorate at least one of the disadvantages of the prior art, or to provide a useful alternative.

One embodiment provides a computer implemented method for managing access to objects available via a file server by a user, the method including:

(i) authenticating the user;

(ii) based on data indicative of an organisational hierarchy, which provides data indicative of memberships of a plurality of users to a plurality of groups, determining a set of groups to which the user belongs; and (iii) for each group to which the user belongs, and for each unique combination of groups to which the user belongs, defining a respective access token;

(iv) combining the defined access tokens into a set of access tokens, which a file server accesses thereby to determine whether or not to grant the user access to a given object.

One embodiment provides a method wherein the given object is associated with a parent group defined in the organisational hierarchy.

One embodiment provides a method wherein, based on the parent group, the given object has defined for it a subtractive access token based upon the parent group.

One embodiment provides a method including a step of identifying one or more security labels associated with the user, and wherein (iii) includes defining respective access tokens for each unique combination of groups and security labels.

One embodiment provides a method wherein the given object is associated with a parent group defined in the organisational hierarchy and one or more security labels, and wherein, based on the parent group, the given object has defined for it a subtractive access token based upon the parent group and the security labels.

One embodiment provides a method wherein, in each instance where a user belongs to a group, that user is associated with a permission set for that group.

One embodiment provides a method wherein a permission set defines multiple access permission types.

One embodiment provides a method including a step of delivering data indicative of the set of access tokens to a software application associated with the user, wherein the file server interacts with that software application when determining whether or not to grant access to a given object.

One embodiment provides a method wherein the set of access tokens are provided to a Security Token Service.

One embodiment provides a computer implemented method for managing access to objects available via a file server by a user, the method including:

(i) receiving data indicative of an object for ingestion;

(ii) receiving data indicative of a user selection of a parent group for the object, wherein the parent group is selected from an organisational hierarchy that includes a plurality of groups organised in a hierarchical framework;

(iii) receiving data indicative of one or more security parameters for the document; and (iv) defining access requirements for the document based upon the parent group and the security parameters.

One embodiment provides a computer program product for performing a method as described herein.

One embodiment provides a non-transitive carrier medium for carrying computer executable code that, when executed on a processor, causes the processor to perform a method as described herein.

One embodiment provides a system configured for performing a method as described herein.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being imitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

As used herein, the term "exemplary" is used in the sense of providing examples, as opposed to indicating quality. That is, an "exemplary embodiment" is an embodiment provided as an example, as opposed to necessarily being an embodiment of exemplary quality.

BRIEF DESCRIPTION OF THE DRAWINGS

Embodiments of the invention will now be described, by way of example only, with reference to the accompanying drawings in which.

DETAILED DESCRIPTION

Figure 1A:
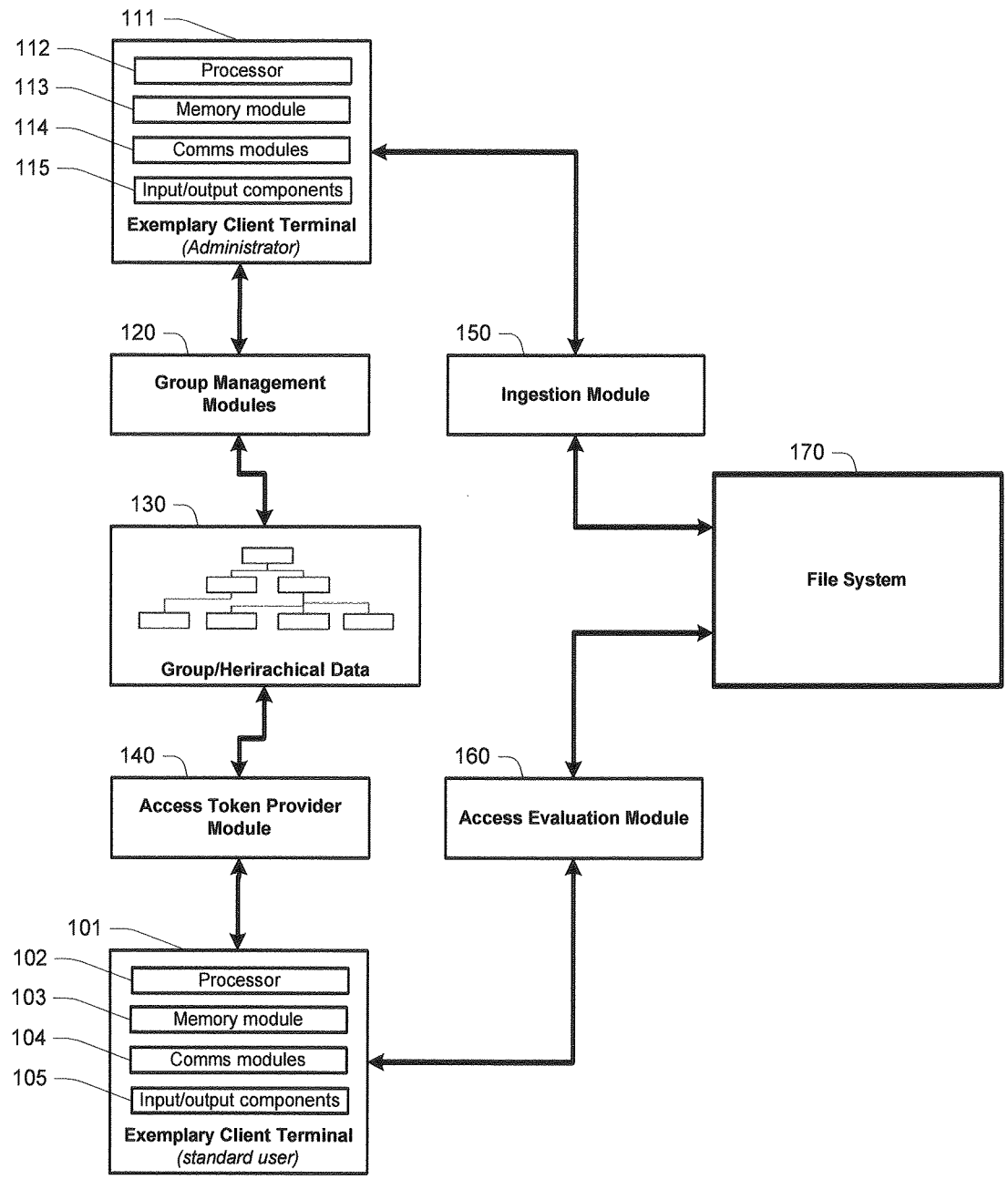
FIG. 1A schematically illustrates a framework according to one embodiment.

Described herein are systems and methodologies for managing document access permissions. Embodiments of the invention have been particularly developed for allowing group-based permission management in a file system. While some embodiments will be described herein with particular reference to that application, it will be appreciated that the invention is not limited to such a field of use, and is applicable in broader contexts.

In overview, the technologies disclosed herein allow document access permissions to be managed based on a hierarchical group structure. More specifically, document access permissions are managed based on relationships defined in an organisational group hierarchy (such as an organisational chart). A user is granted access tokens based on intersections of groups to which they belong. These intersections (and hence access tokens) are determined on-the-fly, for instance whenever a user logs in to access a file server, or each time a protected document is requested. In this manner, modifications to the organisational structure inherently flow on to effect users' access permissions. Furthermore, document ingestion is configured such that each document (or object) is associated with a parent group, such that modifications to the organisational structure also have a flow-down effect in terms of access token requirements.

FIG. 1A to FIG. 10 illustrate exemplary frameworks according to various embodiments. It will be appreciated that these represent only a selection of potential embodiments, with numerous further modifications and variations being possible. Similar/corresponding components are designated by corresponding reference numerals.

In the figures, two exemplary client terminals are illustrated. These are an exemplary standard user terminal 101, and exemplary administrator client terminal 111. From a practical perspective, these comprise similar hardware components: a processor (102, 112), a memory module (103, 113) that stores software instructions executable on the processor (102, 112), communications modules (104, 114) such as a network adaptor, and input/output components (105, 115). The key difference relates specifically to the manner in which the terminals are used, with terminal 101 being used by a standard user who simply wishes to access document's in a file system 170, and terminal 111 being used by an administrator user who wishes to manage a set of group/hierarchical data 170, and manage the ingestion of a document into file system 170. It will be appreciated that, in practice, a give terminal may be used in both manners.

Terminal 101 is configured to interact with an access token provider module 140. Module 140 may be provided by way of software executing on terminal 101, or by software executing at a server device (accessible via a proprietary software application executing on terminal 101 or via a web-browser arrangement). Access token provider module 140 is configured to process user credentials (for example in response to a user login), and define a set of access tokens for the user. The set of access tokens is determined based on information in group/hierarchical database 130.

Group/hierarchical database 130 maintains data indicative of a plurality of users' memberships to a plurality of groups. These groups are defined in a hierarchical structure (or by way of a plurality of independent hierarchical structure), and may comprise groups defined for a local system and/or external systems. Groups are arranged in parent-child relationships.

In each instance of membership, there is an associated permission set. For example, database 130 may indicate that User A is a member of Group B with permission set C. A "permission set" defines a set of permissions that a given user holds in relation to a given group. For example, there may be a first permission set defining "read, write and delete", and another defining "read, no write, no delete". In terms of database 130, the permission sets may be represented by unique identifiers.

In overview, when a user logs into the system, security checks are performed and a set of access tokens are built up against the user. This includes a concatenated list of the hierarchy of groups of which the user is a member, and for each group the permission set to which the user has access. Some of these groups are marked as "Limited Distribution Groups" which preclude users that are not direct or indirect members of that group from seeing a particular securable item (such as a document). This set of access tokens is defined thereby to represent every group (from every level of the hierarchy) to which the user belongs, and is flattened to represent a particular element of an access token. An example is provided below, in terms of a flattened hierarchy of access tokens based on nested group membership and sets of permissions against each group membership (group-specific "permission sets"):

Access Tokens for User X:
Group1-PermissionSet1
Group1-PermissionSet2
Group1-PermissionSet3
Group2-PermissionSet1
LimitedDistributionGroup1-PermissionSet1

Each access token provides the user with access to a particular set of documents. This concatenated set of access tokens represents the intersection of groups and permission sets. Permissions are provided in a subtractive manner rather than an additive manner. That is, in a hypothetical example a user must be a member of "Group 1" and "Group 2" (and possibly another external system group) to gain access to a particular document. Such an intersection could apply to a unique combination or any number of intersected groups.

In some embodiments, in addition to group memberships, additional security parameters (also referred to as security labels) may be present. For example, these may define user attributes, such as whether they possess certain qualifications, attributes, and so on. Respective access tokens are defined for each unique combination of groups and security labels. In this manner, where a given object is associated with a parent group defined in an organisational hierarchy and one or more security labels, the given object has defined for it a subtractive access token based upon the parent group and the security labels (for example requiring specific group membership AND one or more security parameters/labels).

The group hierarchical structure may be modified by way of group management modules 120 via terminal 111. For example, additional groups may be created, and group relationships changed. In some embodiments import tools are provided thereby to enable the generation of a hierarchical structure in database 130 based upon a third party produced organisational chart file.

Figure 5:
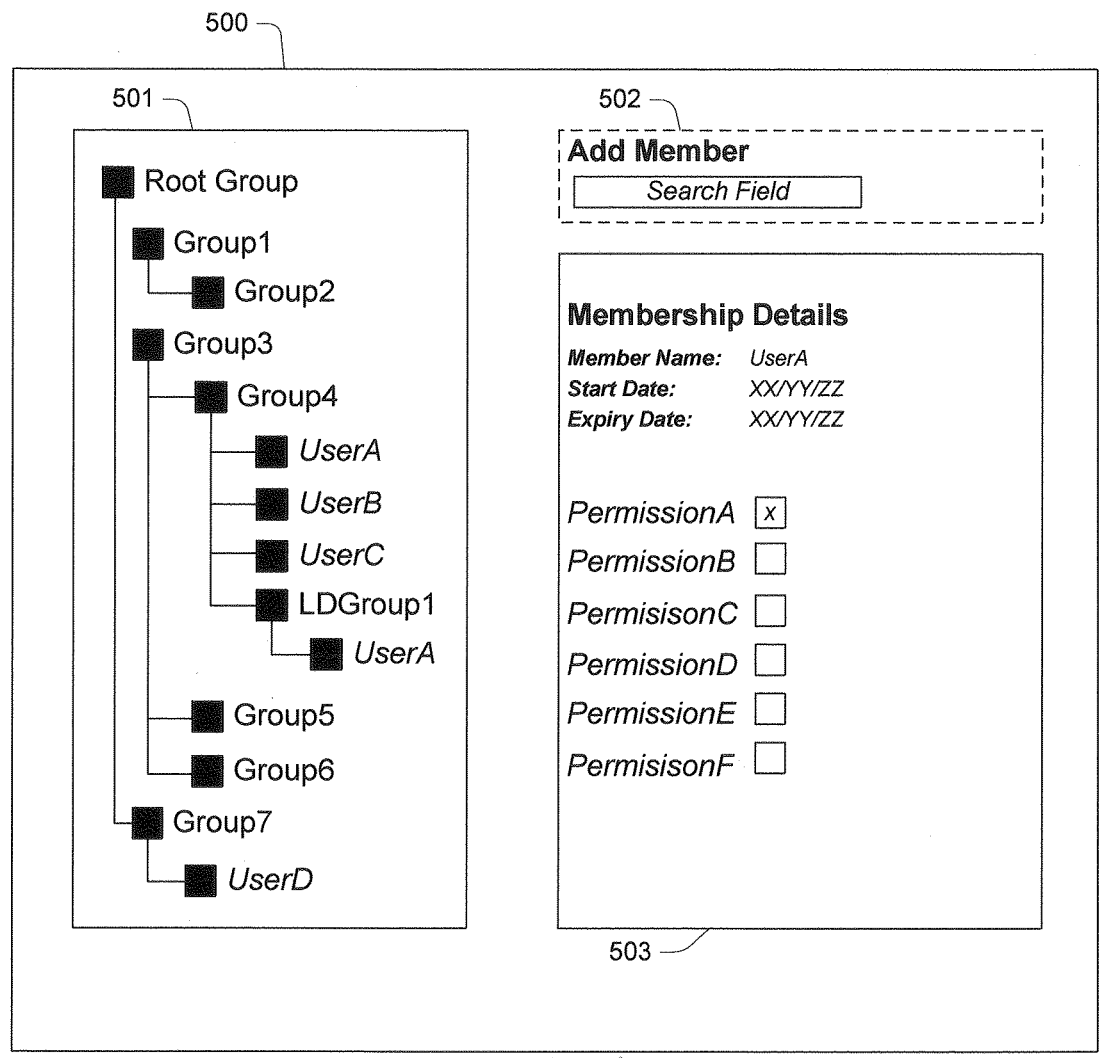
FIG. 5 illustrates a GUI according to one embodiment.

FIG. 5 illustrates an exemplary user interface 500 that enables group management and permission management. An object 501 enables the creation of groups via a tree structure, including adding new groups, moving groups, deleting groups, duplicating groups, and so on. An object 502 is used to add members to a selected group. Specifically, a search field is provided to facilitate identifying a desired member. A membership details object 503 provides details for a selected member or group, and allows for the setting of permissions (via check boxes in this example). In some cases, all permissions for a given group by default filter through to all children. In some embodiments permissions are able to be set at a group level and at a user level individually for granulated control over permissions. As shown in object 503, a membership ("user" or "group", with "user" being shown) includes a start date and expiry date, such that membership can be automatically terminated on a given date.

Object 501 illustrates an exemplary limited distribution group LDGroup1 within Group 4, and including a subset of members of Group4. This may be automatically generated in response to a document being assigned access permissions that require both membership of Group4 and membership of a limited distribution group.

In some embodiments access tokens are defined by an Administrative Graphical User Interface (GUI), which supports enumeration of the hierarchy of concatenated access tokens that a user has based on group membership. The Administrative GUI is configured to apply any hierarchy of intersected access tokens (and sets of permissions) established against any existing documents or objects. This enables all objects in the file system 170 to be treated as one large "bucket" of objects (for example documents, files, URLs, sites, subsites, etc) classified and segregated by organisational hierarchical groups rather than technology-based divisions. This is discussed in more detail below by reference to FIG. 3.

Ingestion module 150 enables a user (for example a user of terminal 101 or 111) to coordinate ingestion of a document (or other object) from an external source into file system 170 (and/or updating of security parameters and the like for an existing document or object). When ingesting a document from an external source or updating an existing object, a user interface is presented at the user's terminal thereby to capture key security and other information. This includes the selection of organisational parent group for a document/object (being a group defined in database 130). This organisation parent is associated with explicit permissions, and also associated with implicit permissions based on its position in the hierarchy. Once ingested, a hierarchy of pre-aggregated access tokens (or rights to access an object within the system) are applied to the document or object based on the user-inputted key security and other information.

Figure 1B:
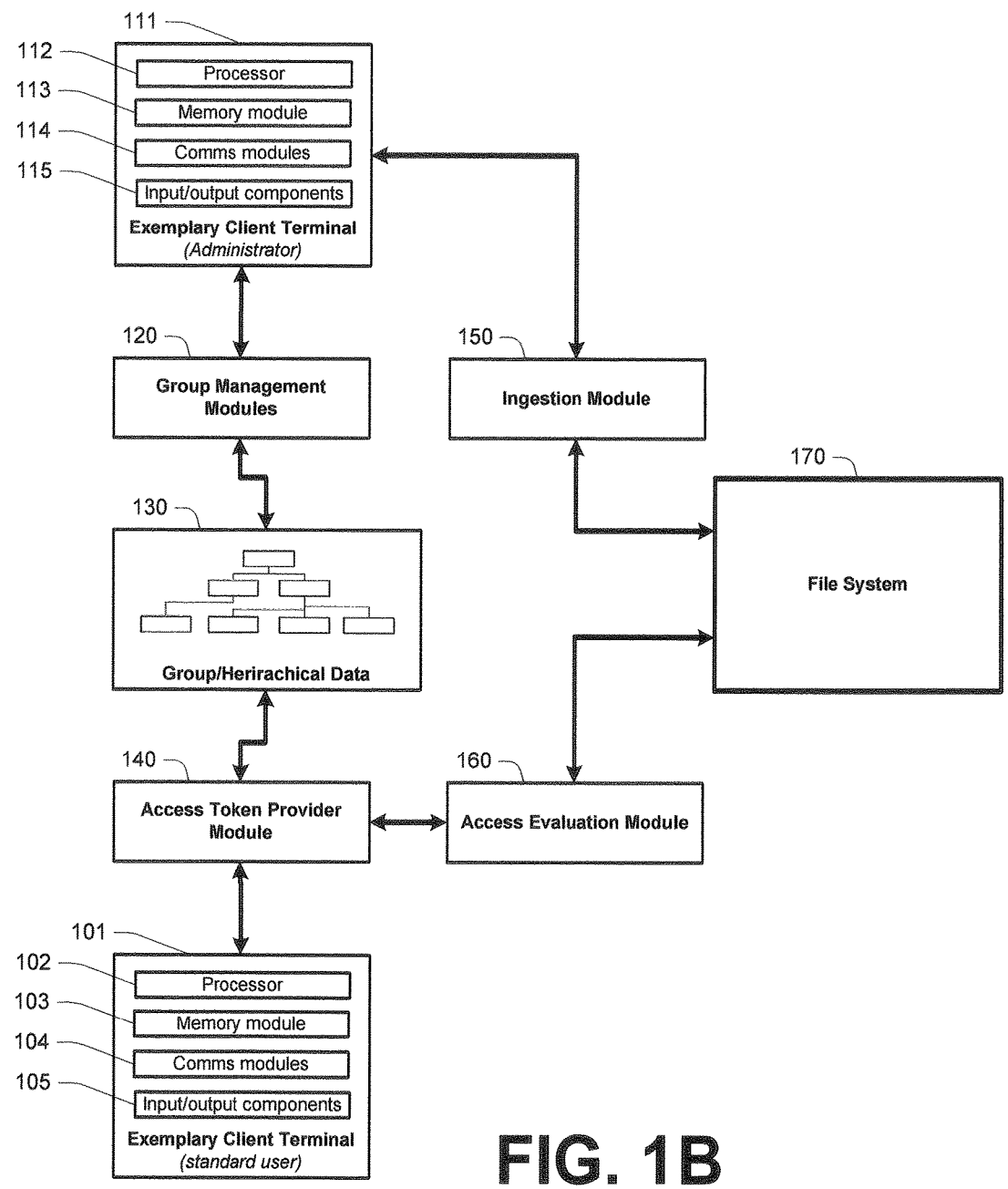
FIG. 1B schematically illustrates a framework according to one embodiment.
Figure 1C:
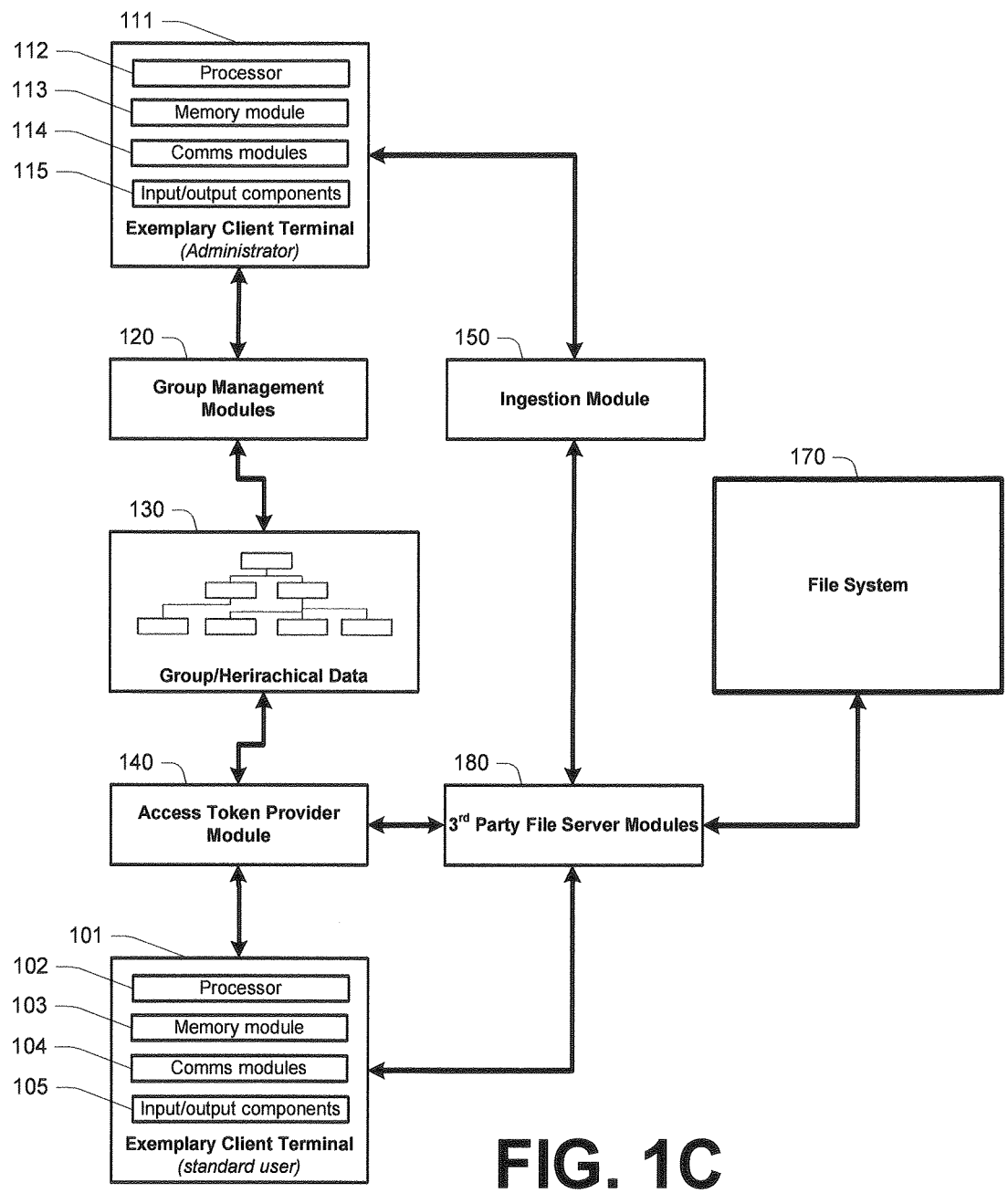
FIG. 1C schematically illustrates a framework according to one embodiment.

In FIG. 1A and FIG. 1B, an access evaluation module 160 is configured to manage access by a user of terminal 101 to files (and other documents/objects) made available by file server 170. This may occur by way of direct interaction (as in FIG. 1A) or via interaction with module 120 (as in FIG. 1B). In the example of FIG. 10, module 160 is replaced by $3^{rd}$ party file server modules 180, which may by way of example be provided by way of a product such as Microsoft SharePoint. In that regard, technologies disclosed herein may be configured for integration with such existing software platforms. For example, module 120 may take the form of a Security Token Service (STS) thereby to grant access tokens that are able to be used by such third party platforms.

Figure 2A:
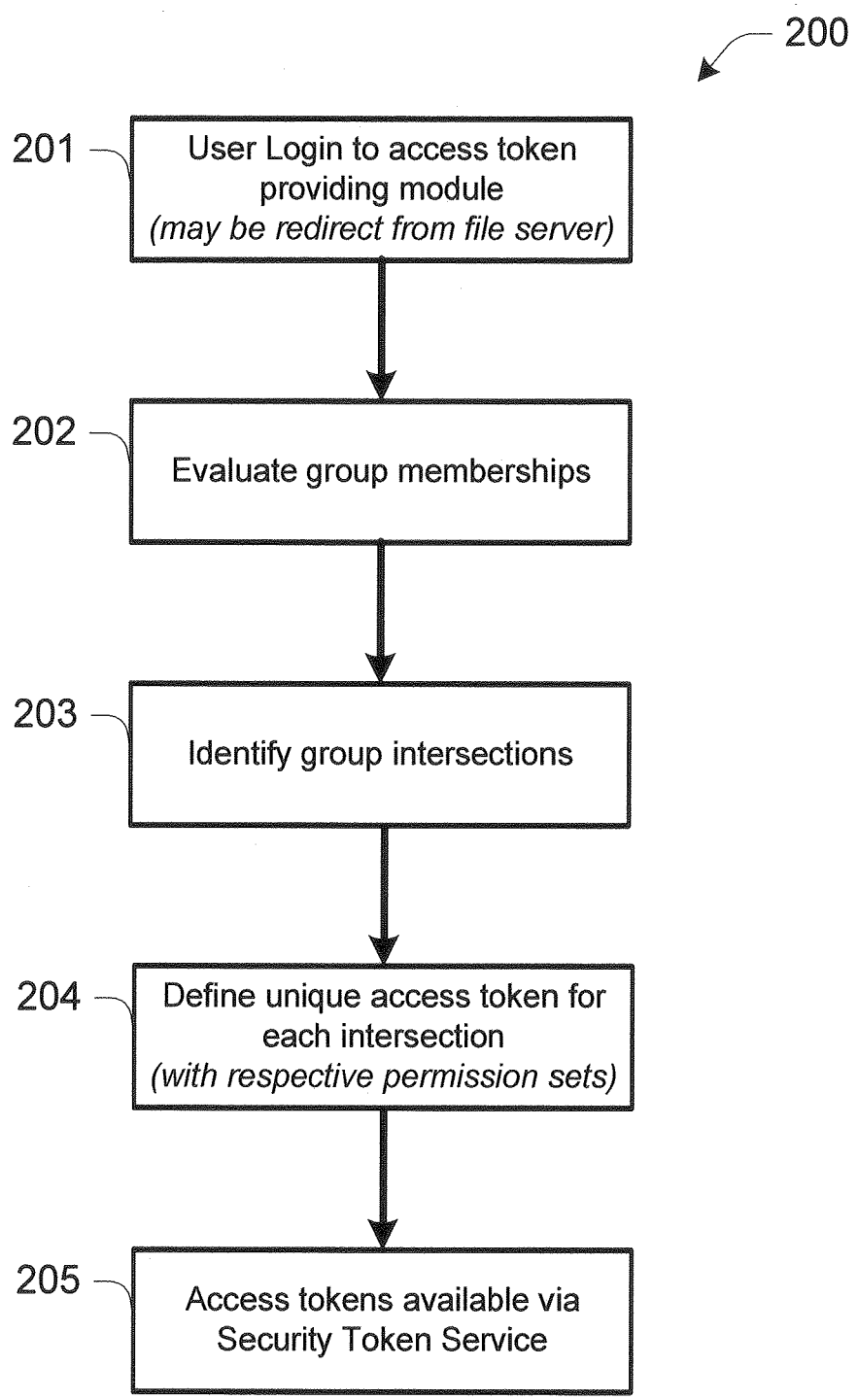
FIG. 2A illustrates a method according to one embodiment.

FIG. 2A illustrates method 200 according to one embodiment, performed by access token providing module 120. Functional block 201 represents a process whereby a user performs a login. This may by way of a redirect from a separate platform/module, for example in response to a user attempting to gain access to file server 170. That is, in some embodiments an attempt to access file server 170 (or certain objects made available by file server 170) results in a redirect to log in via module 120. In some embodiments standard access tokens are added by a Security Token Service (STS) itself. These tokens act as tickets to provide permissions to an object.

Functional block 202 represents a process whereby group memberships are evaluated for the relevant user. This preferably includes identifying all the groups of which the user of member. This may include both internally-defined group memberships, and externally-defined group memberships. For each membership, a permission set (or sets) associated with that group membership is identified.

Functional block 203 represents a process including identification of group intersections. For example, assume a user is a member of Groups 1, 2 and 3. This means the user should obtain permissions associated with being a member of Group 1, a member of Group 2, a member of Group 3, a member of Group 1 and 2, a member of Group 1 and 3, a member of Group 2 and 3 a member of Group 1, 2 and 3. Then, if the user has multiple permission sets for any of these groups, the number of combinations increases further. Each combination of groups and permissions is used to define a unique intersecting access token (as represented by functional block 204), and these are appended to the user's access tokens (as represented by functional block 205).

Figure 2B:
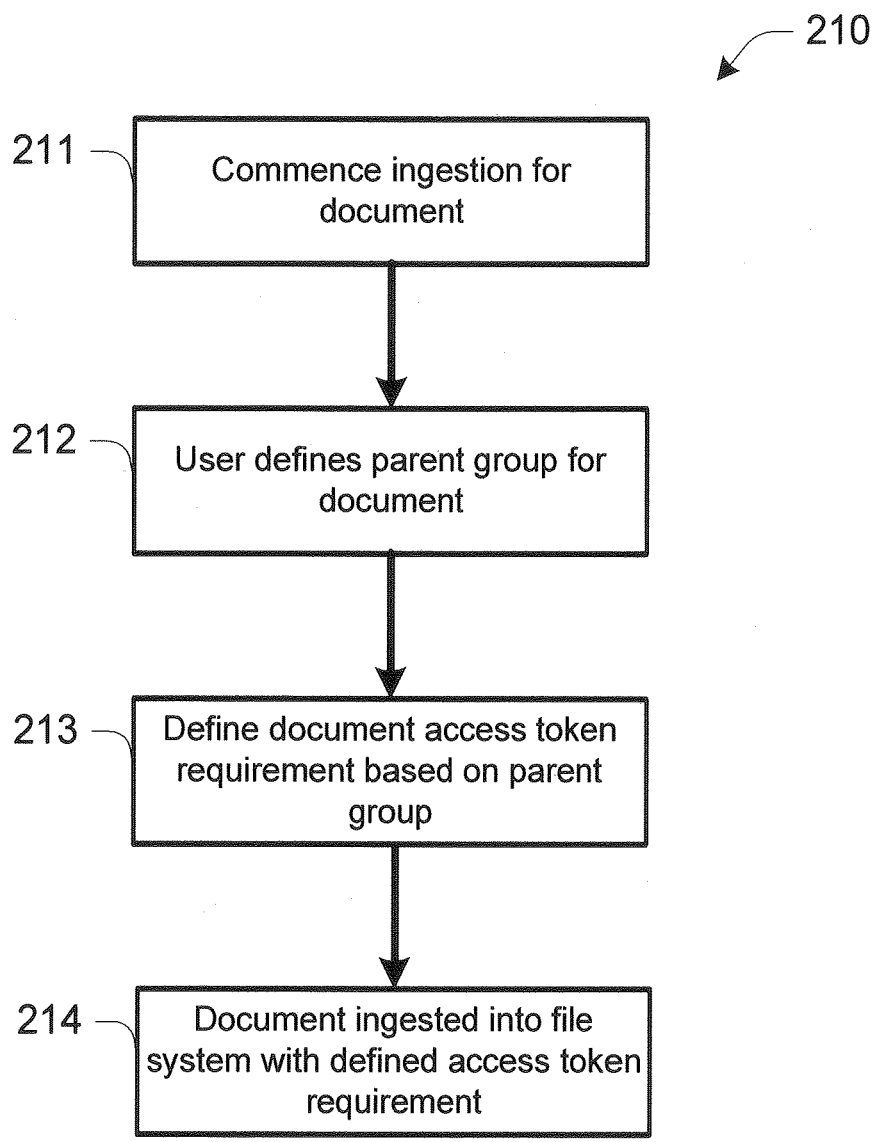
FIG. 2B illustrates a method according to one embodiment.

FIG. 2B illustrates an exemplary method 210 relating to document ingestion, and more specifically to application of matching subtractive, hierarchical access tokens permissions to individual documents and objects. This is in some embodiments performed via ingestion module 150. Although the method is described by reference to ingestion for a new document, it will be appreciated that the method may be adapted for ingestion of any form of object, and/or for modification of security parameters for an existing document/object.

Ingestion commences at 211, for example in response to a "save" command, or a "drag and drop" interaction in relation to a user interface that provides access to file server 170. This triggers a process (provided via the user interface inherently, or by launching of a plugin or the like) which prompts a user to define a parent group for the document at 212. The parent group is selected from groups defined in database 130.

As context, every object made available by file server 170 is associated with a unique parent group. A user selects that parent group (and enters other security information) during ingestion through a user interface provided by ingestion module 150. This parent group is used to determine access tokens that are to be applied to the object. Technology based containers for individual objects such as lists and sites can also have a parent group defined on them. This will then allow users with a certain set of permissions against the parent to accordingly have the same permissions overlayed on top of those container objects.

Functional block 213 represents a process including, for a given object, defining a set of security information based on the defined parent group for that object. An object can only have one parent, and hence can have only one context against which permissions for each member (a group or user) are defined. At a practical level, the object is released or locked in respect of a given user based upon their concatenated access token (for example based on the process flow illustrated in FIG. 4).

Functional block 214 represents a process whereby the document/object is ingested (i.e. saved) into the file system associated with file server 170 with its defined access token requirement (derived from its parent group).

In terms of document access, upon a user attempting to view a document directly (or see a document), the file server system is configured to automatically check that the user is authenticated (if not then the user is redirected for authentication via method 200), then evaluate the user's access tokens. This is a standard functionality for many out-of-the-box file server software applications (such as SharePoint's access tokens-permissions functionality).

Based on method 210, the file server maintains data indicative of a set of concatenated, hierarchical access tokens defined against each object. Access approval includes performing matching of these access tokens against those associated with the user. Where there is a match for a given document between its concatenated hierarchical access token (defined based on its parent group) and one of the user's access tokens (based on combinations of groups to which the user belongs) then access is granted based on the permission set or the matching access token. This approach may be additionally used to show or hide objects (also known as "security trimming" of objects) as required on behalf of the file server system.

To enable convenient administration of access tokens hierarchies, a custom user interface is provided via module 120. This allows an administrator user to ensure that the access tokens provided to logged-in users are correct and cover all required concatenated combinations of groups and permissions.

The user interface provided via module 120 additionally allows a user to make changes to the hierarchical organisational model. To overlay changes to the hierarchical parent-permissions model onto existing objects in the system, the user interface applies permissions defined on parent objects to all objects tagged with the same "Parent" metadata tag. In this way, the complex set of concatenated access tokens can be generated and applied to all objects, lists and sites and sub-sites without an administrator being aware of all combinations of groups and permissions possible against a securable object (list, site or item).

Figure 3:
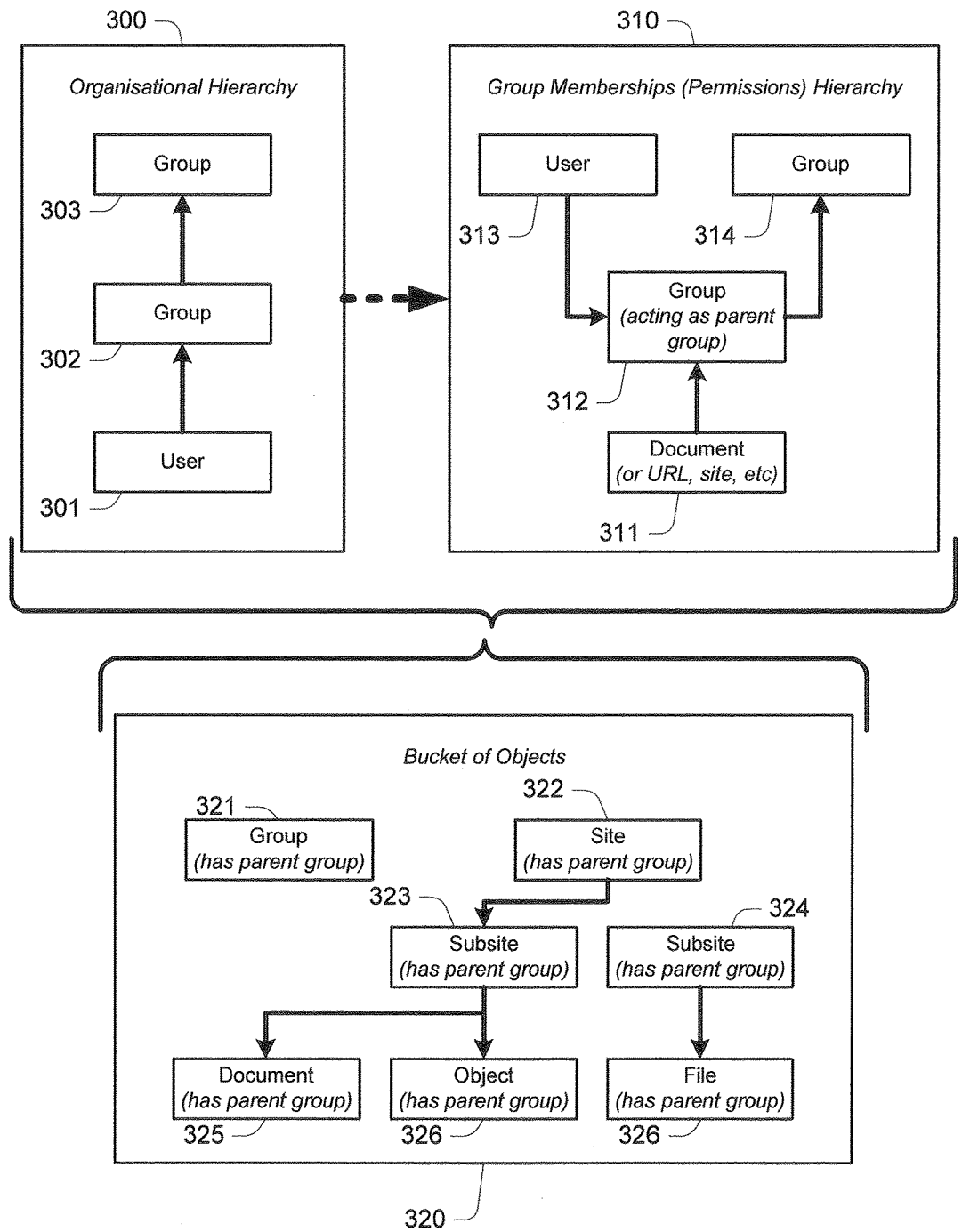
FIG. 3 provides a representation of mapping between hierarchical structures.

FIG. 3 provides a representation of mapping between hierarchical structures. Item 300 illustrates relationships within an organisational hierarch, whereby a user 301 belongs to a group 302, and group 302 in turn belongs to a group 303. Group 30 may have multiple child users, and group 303 may have multiple child groups. This maps to a group memberships *permissions) hierarchy 310. An organisational hierarchy may be more or less finely grained as opposed to the group membership hierarchy. Typically, every organisational hierarchy group maps to one or more permission sets. In this example, an object 311 (such as a document, file, URL, site, subsite, or the like) belongs to a parent group 312 (as defined in method 210). A user 313 belongs to parent group 312, and parent group belongs to another group 314.

The permissions and group hierarchy is automatically applied using concatenated access permissions. This allows a bucket of objects to be managed on the basis that they each have their own unique parent groups. An exemplary bucket 320 shows number of objects, each of which include a unique defined parent group that is used, as discussed above, to defined access token for the object.

Exemplary Login and Document Access Process

Figure 4:
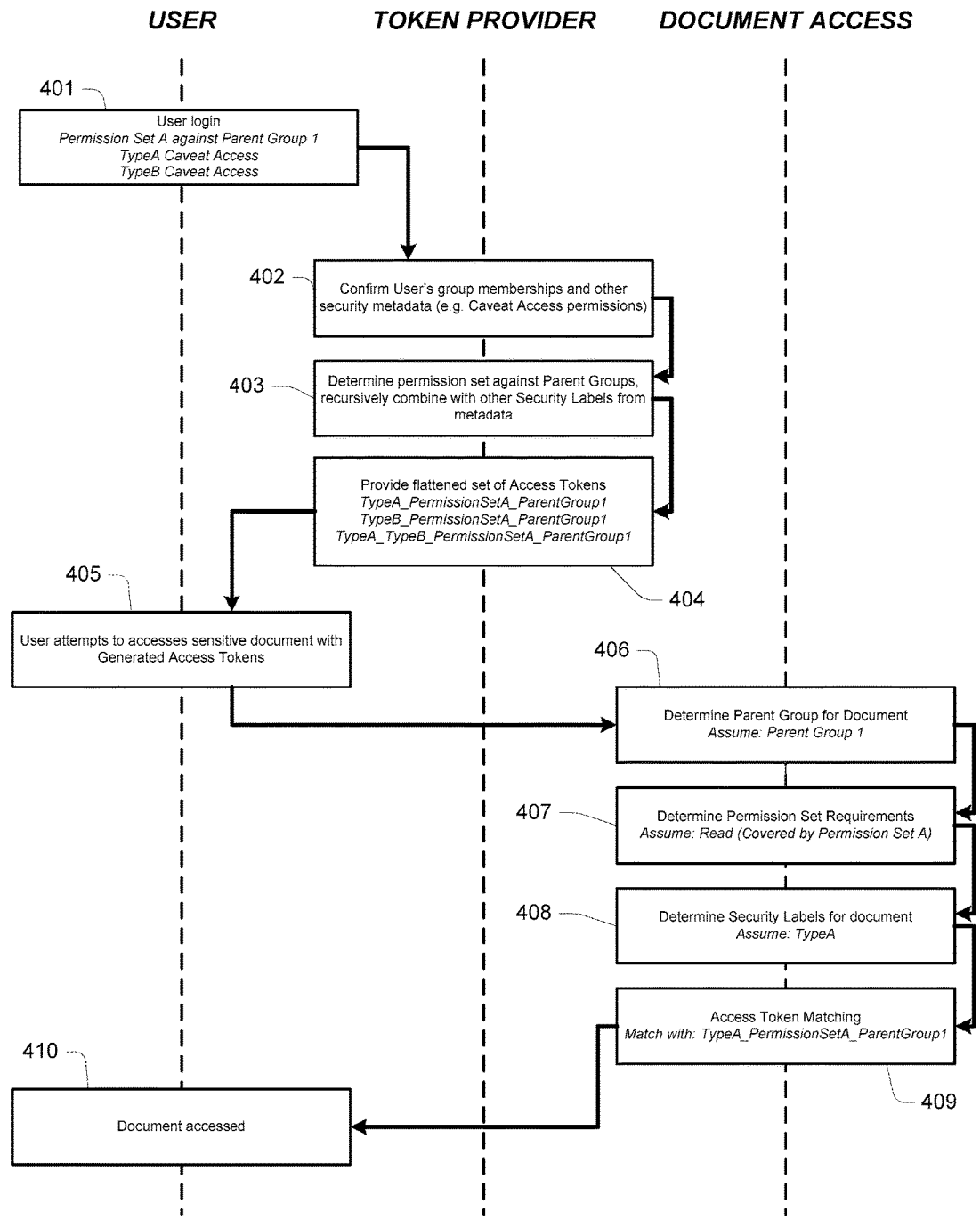
FIG. 4 illustrates exemplary process flows according to one embodiment.

FIG. 4 illustrates an exemplary login and document approval process.

Functional block 401 represents the commencement of a user login. For the sake of this example, we assume that the user has Permission Set A (which, for the sake of example, includes "read" and "edit" permissions) against a group Parent Group 1. It is also assumed that the user's account is associated with additional security parameters (or security labels), for example by way of metadata. In this case, the user is associated with TypeA Caveat Access and TypeB Caveat Access. For example, these security parameters may be assigned to a user by a security administrator by updating/modifying data defining the user's user account.

At 402, an access token provider subsystem confirms the user's group memberships and other security metadata from available data stores. In this case, it is identified that the user is a member Parent Group 1 (with Permission Set A) and has TypeA and TypeB caveat access. At 403 a recursive combination process is performed with respect of the group/permission set combination(s) and security labels. This, at 405, allows a flattened set of access tokens to be provided to the user. In this example, the access tokens are:

TypeA_PermissionSetA_ParentGroup1;
TypeB_PermissionSetA_ParentGroup1; and
TypeA_TypeB PermissionSetA_ParentGroup1.

At 405 the user attempts to access a sensitive document (which may in other examples be an alternate form of object), based on the generated flattened set of access tokens. A document access subsystem determines, at 406 to 408, access requirements for the document. In this case we shall assume that the document requires Parent Group 1 with a "read" permission (such included in as Permission Set A), and a TypeA security label. Accordingly, it is determined at 409 the document requires a TypeA_PermissionSetA_ParentGroup1 access token. On the basis that this is among the access tokens held by the user, access is granted at 410.

Conclusions and Interpretation

It will be appreciated that the disclosure above provides various significant systems and methodologies for managing document access permissions Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while diagrams only show a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media; a medium bearing a propagated signal detectable by at least one processor of one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

It should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A computer implemented method for managing access to objects available via a file server by a user, the method including:
   authenticating the user;
   based on data indicative of an organisational hierarchy, which provides data indicative of memberships of a plurality of users to a plurality of groups, determining a set of groups to which the user belongs, wherein each membership has an associated permission set, wherein the permission set defines a set of permissions that a given user holds in relation to membership of a given group;
   for each user, determining a hierarchy of groups for which that user has membership;
   for each user, creating a concatenated list of the hierarchy of groups for which that user has membership, wherein the concatenated list includes, for membership, the permission set associated with that membership;
   for each group to which the user belongs, and for each unique combination of groups to which the user belongs, defining a respective access token; and
   combining the defined access tokens into a concatenated set of access tokens, such that the concatenated set of access tokens represents an intersection of groups and permission sets, wherein permissions are provided in a subtractive manner rather than an additive manner, wherein a file server accesses the concatenated set of access tokens thereby to determine whether or not to grant the user access to a given object;
   wherein:
      the objects available via the file server are each uniquely associated with a parent group defined in the organisational hierarchy;
      for each object, a subtractive access token is defined based on its parent group in the organisational hierarchy, wherein defining a subtractive access token for a given object includes defining a token that is representative of the parent group and each higher-level group in the organisational hierarchy under which the parent group is nested.

2. A method according to claim 1 including a step of identifying one or more security labels associated with the user, and wherein (iii) includes defining respective access tokens for each unique combination of groups and security labels.

3. A method according to claim 2 wherein the given object is associated with a parent group defined in the organisational hierarchy and one or more security labels, and wherein, based on the parent group, the given object has defined for it a subtractive access token based upon the parent group and the security labels.

4. A method according to claim 1 wherein, in each instance where a user belongs to a group, that user is associated with a permission set for that group.

5. A method according to claim 3 wherein a permission set defines multiple access permission types.

6. A method according to claim 1 including a step of delivering data indicative of the set of access tokens to a software application associated with the user, wherein the file server interacts with that software application when determining whether or not to grant access to a given object.

7. A method according to claim 1 wherein the set of access tokens are provided to a Security Token Service.

8. A computer implemented method for managing access to objects available via a file server by a user, the method including:
receiving data indicative of an object for ingestion;
receiving data indicative of a user selection of a parent group for the object, wherein the parent group is selected from an organisational hierarchy that includes a plurality of groups organised in a hierarchical framework;
receiving data indicative of one or more security parameters for the document; and
defining access requirements for the document based upon the parent group and the security parameters;
wherein:
the objects available via the file server are each uniquely associated with a parent group defined in the organisational hierarchy;
for each object, a subtractive access token is defined based on its parent group in the organisational hierarchy, wherein defining a subtractive access token for a given object includes defining a token that is representative of the parent group and each higher-level group in the organisational hierarchy under which the parent group is nested.

9. A method according to claim 8 wherein access to the document by a user is determined by reference to a set of access tokens associated with the user, with access being granted a case that the user has an access token that corresponds to the defined access requirements.

10. A method according to claim 9 wherein the set of access tokens for the user is defined by a method including:
based on data indicative of an organisational hierarchy, which provides data indicative of memberships of a plurality of users to a plurality of groups, determining a set of groups to which the user belongs; and
for each group to which the user belongs, and for each unique combination of groups to which the user belongs, defining a respective access token;
combining the defined access tokens into the set of access tokens, which a file server accesses thereby to determine whether or not to grant the user access to a given object.

11. A method according to claim 10 including a step of identifying one or more security labels associated with the user, and wherein (ii) includes defining respective access tokens for each unique combination of groups and security labels.

12. A method according to claim 11 wherein the given object is associated with a parent group defined in the organisational hierarchy and one or more security labels, and wherein, based on the parent group, the given object has defined for it a subtractive access token based upon the parent group and the security labels.

13. A method according to claim 10 wherein, in each instance where a user belongs to a group, that user is associated with a permission set for that group.

14. A method according to claim 13 wherein a permission set defines multiple access permission types.

* * * * *